Figure 1:
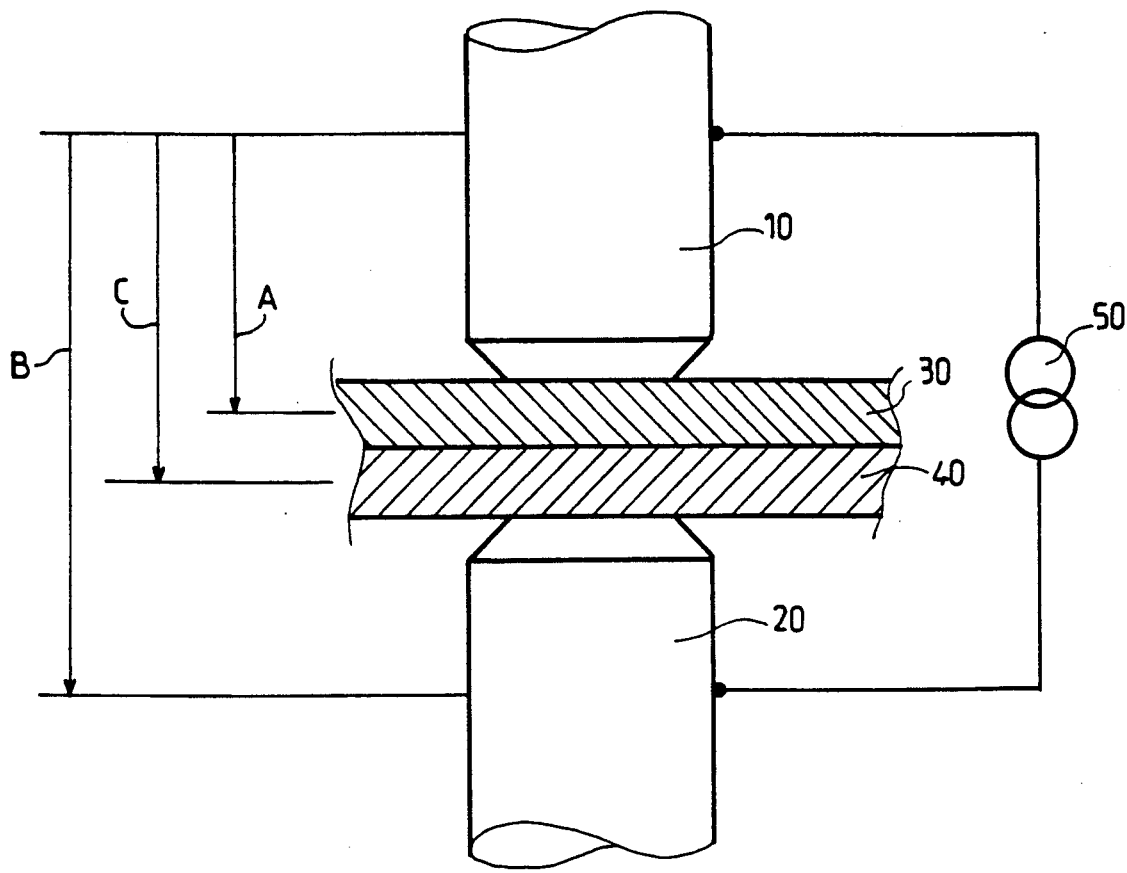

United States Patent [19]

Leon

[11] Patent Number: 5,298,711
[45] Date of Patent: Mar. 29, 1994

[54] CONTROL FOR SPOT WELDING MACHINE USING ELECTRODES AS THERMOCOUPLE

[76] Inventor: Paul Leon, 2, Impasse des Sablons, F-27630 Berthenonville, France

[21] Appl. No.: 953,479

[22] Filed: Sep. 29, 1992

[30] Foreign Application Priority Data

Nov. 18, 1991 [FR] France ................... 91 14371

[51] Int. Cl.$^5$ .............................................. B23K 11/25
[52] U.S. Cl. ...................................... 219/110; 219/109
[58] Field of Search ................................. 219/109, 110

[56] References Cited

U.S. PATENT DOCUMENTS 3,309,494  3/1967  Hebert et al. .

FOREIGN PATENT DOCUMENTS

| 2835750 | 2/1980 | Fed. Rep. of Germany . | |
| 252778 | 12/1987 | Fed. Rep. of Germany | 219/110 |
| 268648 | 6/1989 | Fed. Rep. of Germany | 219/110 |
| 1558609 | 4/1990 | U.S.S.R. | 219/110 |
| 1592138 | 9/1990 | U.S.S.R. | 219/110 |
| 1151353 | 5/1969 | United Kingdom . | |

OTHER PUBLICATIONS

IBM Technical Disclosure Bulletin, vol. 26, No. 8, Jan. 1984, pp. 4108–4109; J. Kloepfer: "Method of measuring the circuit board temperature during drilling".

Primary Examiner—Clifford C. Shaw
Attorney, Agent, or Firm—Laff, Whitesel, Conte & Saret

[57] ABSTRACT

The present invention relates to a process for controlling the parameters of a welding operation performed by a spot-welding machine. The machine has two movable electrodes which are connected to a source of current that supplies a welding current. The process controls the welding parameters on the basis of at least one electric signal that is a function of the temperature in the welding zone. The electrical signal or signals are taken between the terminal of one of the electrodes (10, or 20) and one of the parts to be welded (30, 40). The electrode and part together constitute a thermocouple.

10 Claims, 4 Drawing Sheets

CONTROL FOR SPOT WELDING MACHINE USING ELECTRODES AS THERMOCOUPLE

The present invention relates to a process for controlling the parameters of a welding operation performed by a spot-welding machine.

A spot-welding machine is a machine that essentially comprises two movable electrodes. These two electrodes respectively are connected to the output terminals of a source of current. In order to execute the welding of several parts, the parts are placed against one another then with a pre-set pressure, the facing ends of the electrodes are applied onto the external faces of the external parts. A welding current is then made to run between the two electrodes. That current passes through the thickness of each part and it is strong enough to create a local melting of each part within the zone through which the current passes, and thus to unite them into a whole. Once the welding is achieved, the current is cut-off and the pressure of the electrodes on the pieces is released.

Different parameters come into play in the execution of the spot welding operation: the intensity of the welding current, the duration of the operation, the pressure of the electrodes on the parts to be welded, etc., It is possible to provide welding machines in which these different parameters are adjustable as a function of the given conditions of a welding operation such as, for example, the materials of the parts to be welded.

Likewise, it is possible to modify, and therefore to control, these parameters during a given welding operation. Therefore, in order to make that control efficient, it has been sought to use means that would make it possible to know the welding temperature during the welding operation itself, that is to say means that would develop at least one signal as a function of the temperature in the welding zone.

One purpose of the present invention is to provide a process that makes it possible to control the parameters of the welding operation as a function of the temperature in the welding zone, and in which there are used means to deliver at least one signal that is a function of the welding temperature.

That purpose is achieved by the present invention in that, said electric signal or signals is or are taken at the terminals on the one part, of the one or the other of the electrodes and, on the other part, of one of the parts to be welded or of the other electrode, and in that there are provided means for said signal or signals to be thermoelectric signals.

These signals have a voltage value that is representative of the temperature in the welding zone. It (they) can thus serve to operate a unit that is then capable of governing in real time the different parameters of the welding operation. For example, such a unit can govern the stop of the welding current passage when, on the basis of the temperature signal or signals, a pre-set welding temperature has been reached.

In the present description, when a pair of metals is described as having a thermoelectric power, this means that pair (of metals) can develop a measurable temperature signal, that is to say one in which the voltage value is at least of the order of the millivolt, a value that in reality is dependent on the detection electronics.

Let us specify that the temperature of the welding zone is of the order of 1,500° C., even higher in some cases, and that the number of pairs of materials that, at that temperature, satisfy the above-mentioned conditions is relatively important.

In order to execute the present invention such as just defined, different solutions can be considered. In the following of this specification, there are offered, as examples of execution, a few of these solutions.

Figure 2:
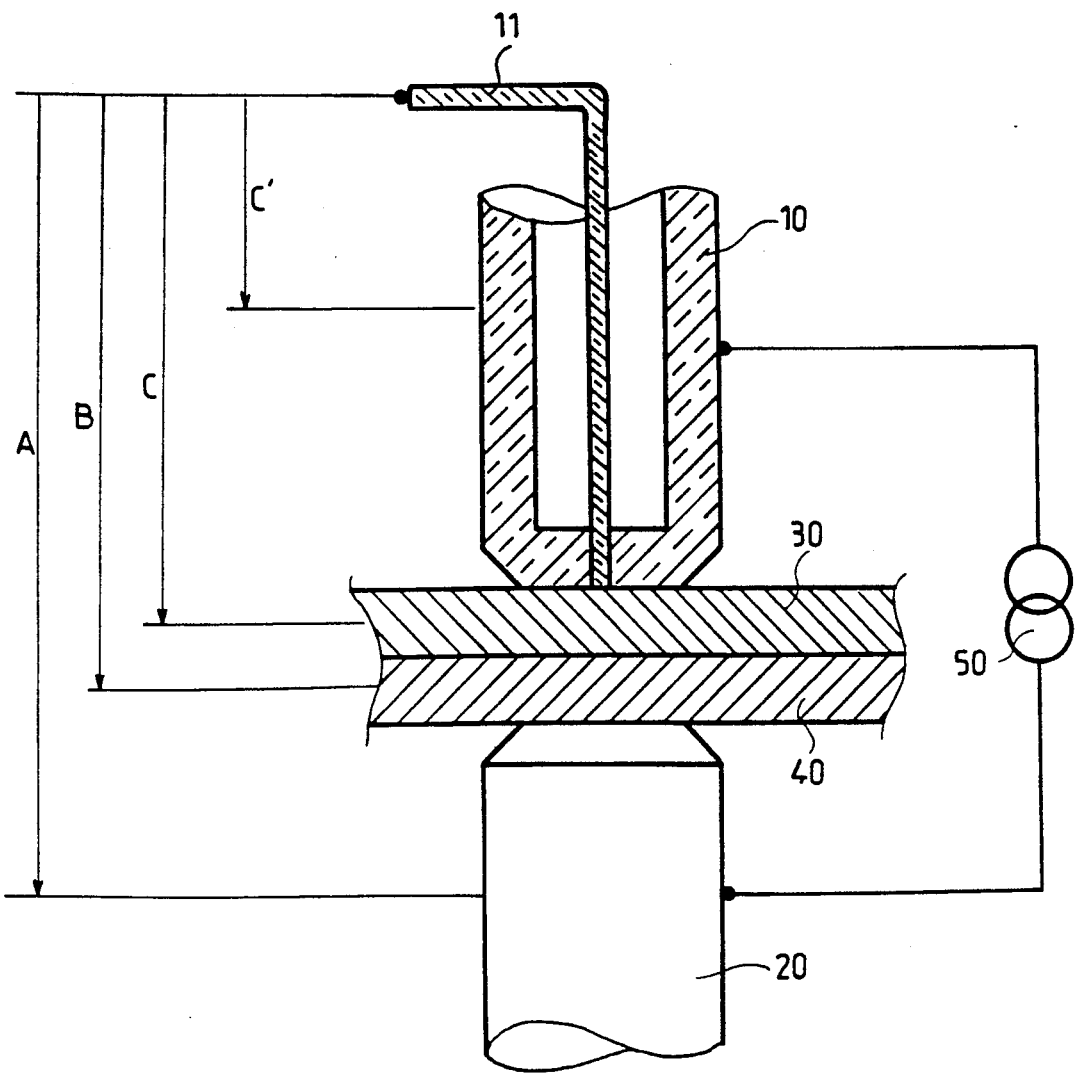
Figure 3:
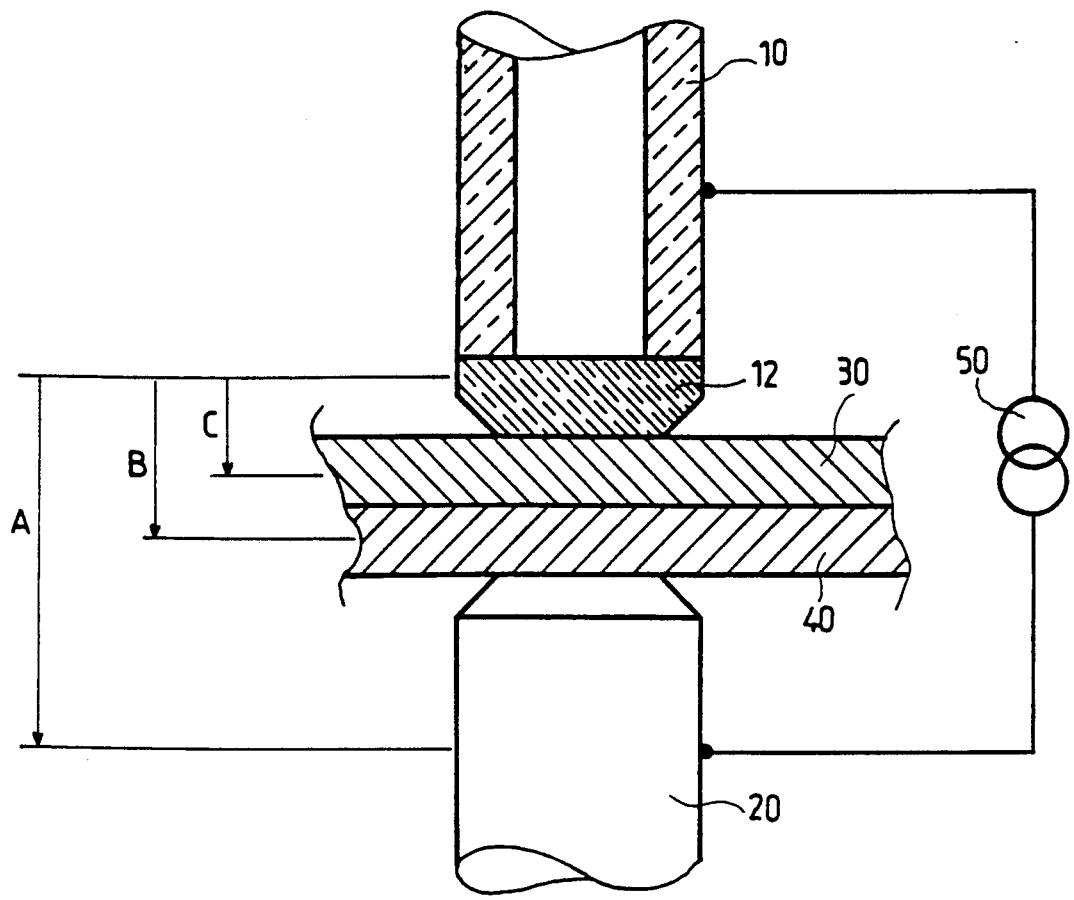
Figure 4:
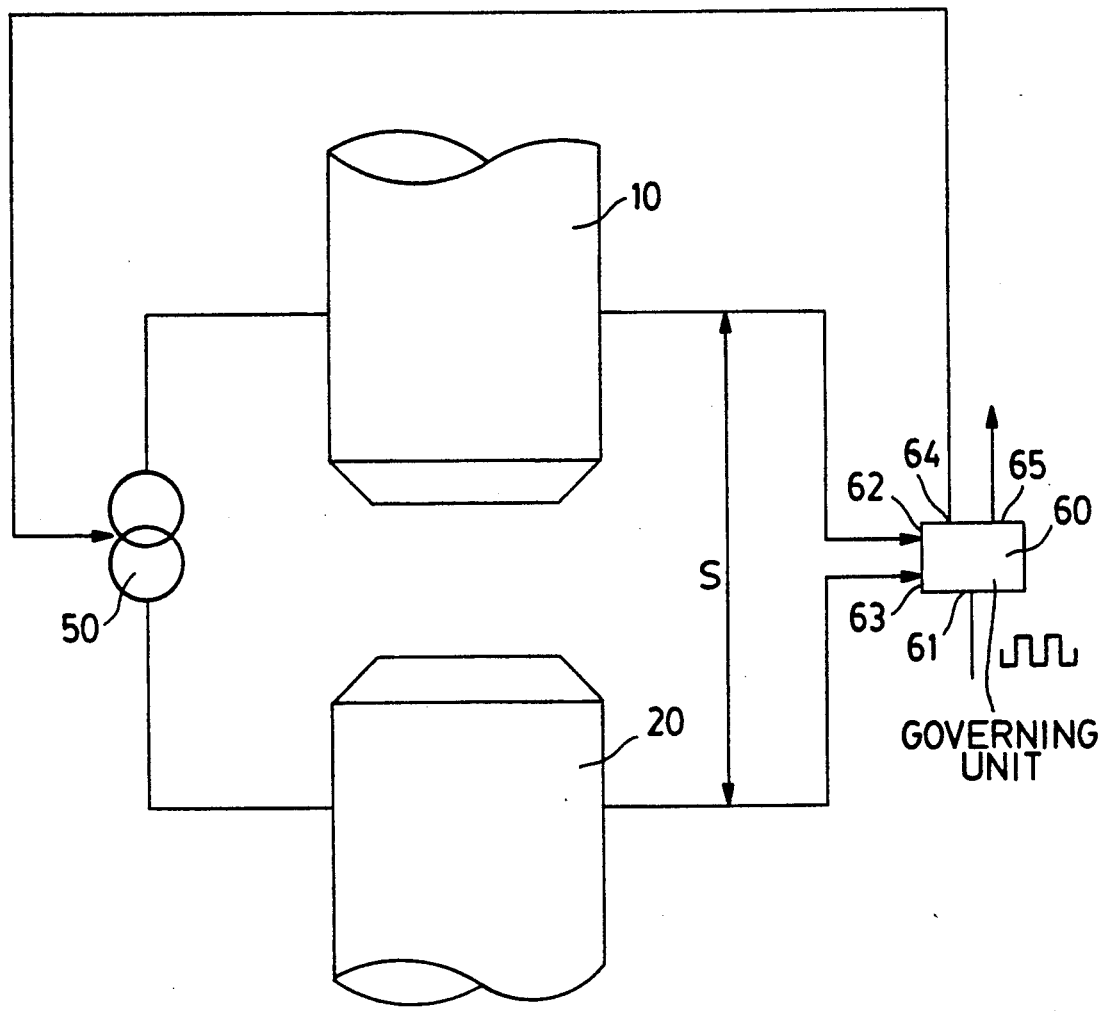

The description of these solutions is given relative to the attached drawing in which:

the FIGS. 1 to 3 respectively are schematic views of machines according to the first, second and third modes of execution of the invention, and FIG. 4 is a schematic view of a machine equipped with a governing unit, that view showing a possible mode of operation of that governing unit.

In FIG. 1, there is seen a first electrode 10 and a second electrode 20 of a spot welding machine. the electrodes 10 and 20 are shown with there ends respectively resting against the external faces of two parts 30 and 40 to be welded.

The two electrodes 10 and 20 are respectively connected to the terminal of a source of current 50 meant to deliver the welding current. That current thus is provided so that it will pass through each one of the parts 30 and 40, within a zone located between the two electrodes 10 and 20, in order to create, within that zone, a melting of the parts 30 and 40 that ensures their welding together.

According to a first mode of execution of the invention, electrode 10 is made up of a material such that it is one of the elements of a thermoelectric couple the second element of which is the material of one of the parts to be welded, or of the other electrode.

For example, if one of the parts 30 or 40 to be welded is made of steel, an electrode 10 may be provided made of a copper-nickel alloy, the other electrode 20 possibly being made of copper. The temperature signal can be taken between, on the one part, the copper-nickel electrode 10 and, on the other part, one or the other of the parts 30 or 40 to be welded, or even the copper electrode 20 as shown by arrows A, B, C in FIG. 1.

The copper-nickel alloy of electrode 10 is such that its thermoelectric power with one of the parts 30 or 40 to be welded is sufficiently important to be measured, this implying that it has a relatively high nickel content. But, taking into account the high intensity of the welding current, and in order to prevent too important heat losses, electrode 10 must have a low specific resistance. The nickel content, therefore cannot be too high. That copper-nickel alloy, consequently, advantageously contains less than 20% of nickel, even less that 10%. tests have shown that a 2% content gives good results, that is to say, the losses by Joul's effect are low, and the temperature signal still has a high enough value so that it can be measured.

The present invention is not limited to the above-mentioned material, that are indicated only for the purpose of explanation, but it also covers materials that fulfill the same functions.

FIG. 2 shows a second mode of execution, In this particular mode, an electrode 10 is longitudinally traversed by a conductor 11 the end of which is flush with the surface of the end of electrode 10 so that, when the latter rests against part 30, the end of conductor 11 is in contact with that part 30. Conductor 11 is made up of a material having a thermoelectric power with one of the parts 30 or 40 to be welded, or with electrode 20.

The welding temperature measuring signal is taken between, conductor 11 on one side, and the body of electrode 10 (arrow C')on the other side, the latter being in electric contact with the part 30 to be welded.

The material that constitutes conductor 11 is, for example, a copper-nickel alloy, such as constantan.

FIG. 3 shows another mode of execution in which a face 12 of relatively limited thickness is affixed to the end of electrode 10. Face 12 is of a material such that the pastille has, with one of parts 30 or 40 to be welded, a measurable thermoelectric power.

The welding temperature measuring signal is taken between, on one side the face plate 12 and, on the other side, one of the parts 30 or 40 to be welded (arrows B and C), or the other electrode 20 (arrow A).

It will be noted that if pastille 12 is thin, it may have a high specific resistance without the losses by Joule's effect being high. As a result, it is possible to choose a material having a high thermoelectric power such as, for example, a copper-nickel alloy with a relatively high percentage of nickel, such as constantan.

In the description that has just been given, the welding of two parts has been considered. The man of the Art will understand that the process of the invention applies equally well whatever may be the number of parts to be welded.

The means used and shown in FIGS. 2 and 3 are, in reality, inserts provided to come in contact with one of the parts to be welded (here 30). It will be understood that other forms of inserts that have a function equivalent to the function of the described means, fall within the scope of the present invention.

The man of the art who has become acquainted with the teaching of the present specification is capable of carrying out a process according to the invention in which the welding parameters are controlled as a function of more than one temperature signal.

For example, two temperature signals may be obtained by providing means, similar to those just described, such that two interfaces between electrodes 10 and 20 and adjacent parts to be welded, or between parts to be welded themselves, will have a thermoelectric power. One signal is taken at the terminals of an electrode 10 on one side, and of one of the parts to be welded on the other side, while the other signal is taken at the terminals of the other electrode 20 on one side, and of one or the other of the parts to be welded on the other side.

FIG. 4 schematically shows a spot welding machine with its two electrodes 10 and 20 and a source of current 50 the two terminals of which are respectively connected to the electrodes 10 and 20. The temperature measuring signal S here is delivered at the terminals of the two electrodes 10 and 20, but it is easy to understand that this can be different, as already explained.

The machine shown here further has a governing unit 60. The latter has an input 61 onto which there is applied an alternating clock signal that, for each period, has two half-periods of approximately equal durations.

Unit 60 also has two inputs 62 and 63 to which the temperature measuring signal S is applied.

Unit 60 further has an output 64 to pilot the source of current 50, and another output 65 to control other parameters of the machine.

The operation of unit 60 is as follows: During the first half-periods of the clock signal, the unit 60 governs the source of current 50 so that it will apply a current of pre-set intensity between the two electrodes 10 and 20. Besides, it ascribes a value to each one of the parameters of the machine. During the second half-periods of the clock signal, it performs the reading of the temperature measuring signal and deduces from the temperature reading thus made, the new values of the parameters of the machine that it will ascribe to the following cycle.

The manner in which the governing unit 60 determines the values of the parameters of the welding operation depends on the skill of the man of the art and therefore it is not described in more detail here.

The main function of the governing unit 60 then may consist, after the reading phase of the temperature signal or signals, and if the temperature has not reached a pre-set threshold value, in ordering the passage of a welding current of a pre-set intensity through the parts to be welded; that is to say, in other words, in ascribing that intensity value to the welding current or, if the found value of the welding temperature has reached that threshold value, in ordering a cutting-off of the welding current to the parts to be welded, that is to say in ascribing a zero value to its intensity.

It will be noted that the response time of unit 60 corresponds to one period of the clock signal. With a clock frequency of 50 Hz, they (the periods) are of 20 milliseconds, this being sufficient for a spot welding operation. A more important precision can be obtained, for example, with a clock frequency of 1,000 Hz.

It will easily be understood that the operation of the governing unit 60 could be very appreciably the same if several temperature signals had been available.

I claim:

1. A process for controlling the parameters of a welding operation performed by a spot-welding machine, said processing comprising the steps of:
   providing two movable electrodes respectively connected to a source of current that supplies a welding current;
   applying a normal pressure to said electrode to a work piece during at least part of a welding operation; controlling said parameters of a welding operation on a basis of an electric signal that is a function of the temperature in the welding zone; and
   taking said electric signal between terminals of the two electrodes, one of the electrodes being made of a material that is one element of a thermoelectric couple and other electrodes being made of a material which is a second element of said thermoelectric couple.

2. A process according to claim 1, wherein said one of the electrodes is made of copper-nickel, and the other of the electrodes is made of copper.

3. A process according to claim 2, wherein said one electrode which is made of a copper-nickel has a nickel content which is less than 20% of the total copper-nickel content of said one electrode.

4. A process according to claim 3, wherein said one electrode which is made of copper-nickel has a nickel content which is of the order of 2% of the total copper-nickel content of said one electrode.

5. A process according to claim 1, wherein one of the electrodes (10) has an insert (11, 12) that, at the time of a welding operation, comes into contact with one of part which is to be welded (30), said insert (11, 12) being made of a material which constitutes one of the elements of a thermoelectric couple, the second element of said thermoelectric couple being the material of the other electrode (20), said signal being delivered at a terminal of one of said electrodes, on one side of the insert (11, 12) and, on the other side of the insert.

6. A process according to claim 5, wherein said insert is a conductor (11) that runs longitudinally through said electrode (10, 20) and the ends flush with the surface of the end of said electrode (10, 20), said conductor 11 comes into contact with an adjacent part to be welded at the same time that said electrode (10, 20) comes into contact with said adjacent part.

7. A process according to claim 5, wherein said insert comprises a face plate (12) mounted at the end of said electrode.

8. A process according to any one of claim 5 to 7, wherein said insert is made of copper-nickel.

9. A process according to claim 8, wherein said insert is made of constantan.

10. A process according to any one of the claims 1–7, wherein, said signal is supplied to a governing unit (60) that operates according to a two-phase cycle; a first of said phases being when the unit assesses the temperature of the welding zone in response to said signal, and a second of said phases being when the unit controls the different parameters of the welding operation and the passage of the welding current between the electrodes (10 and 20).

* * * * *